3,217,138
ELECTRIC IMMERSION HEATER ASSEMBLY
Lester D. Drugmand, Pittsburgh, Pa., assignor to Edwin
L. Wiegand Company, Pittsburgh, Pa.
Filed Jan. 9, 1962, Ser. No. 168,302
3 Claims. (Cl. 219—336)

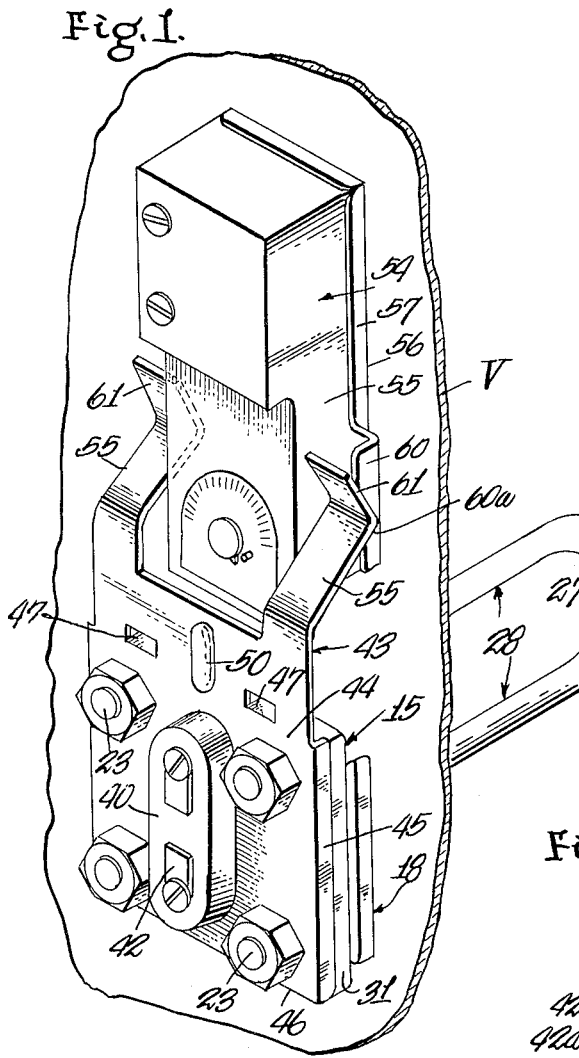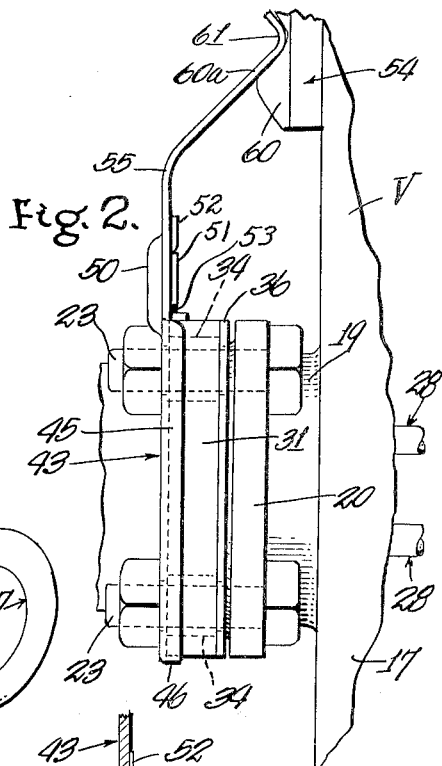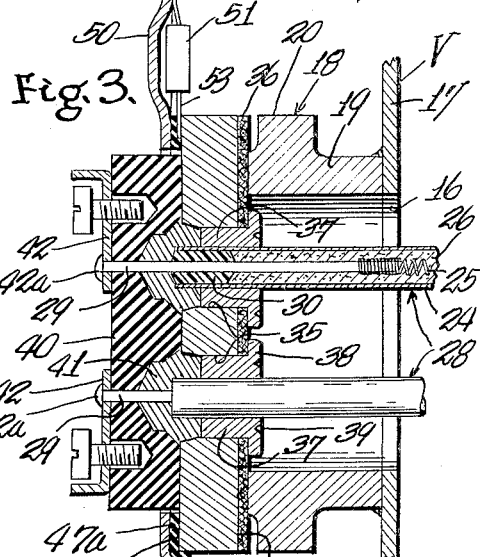

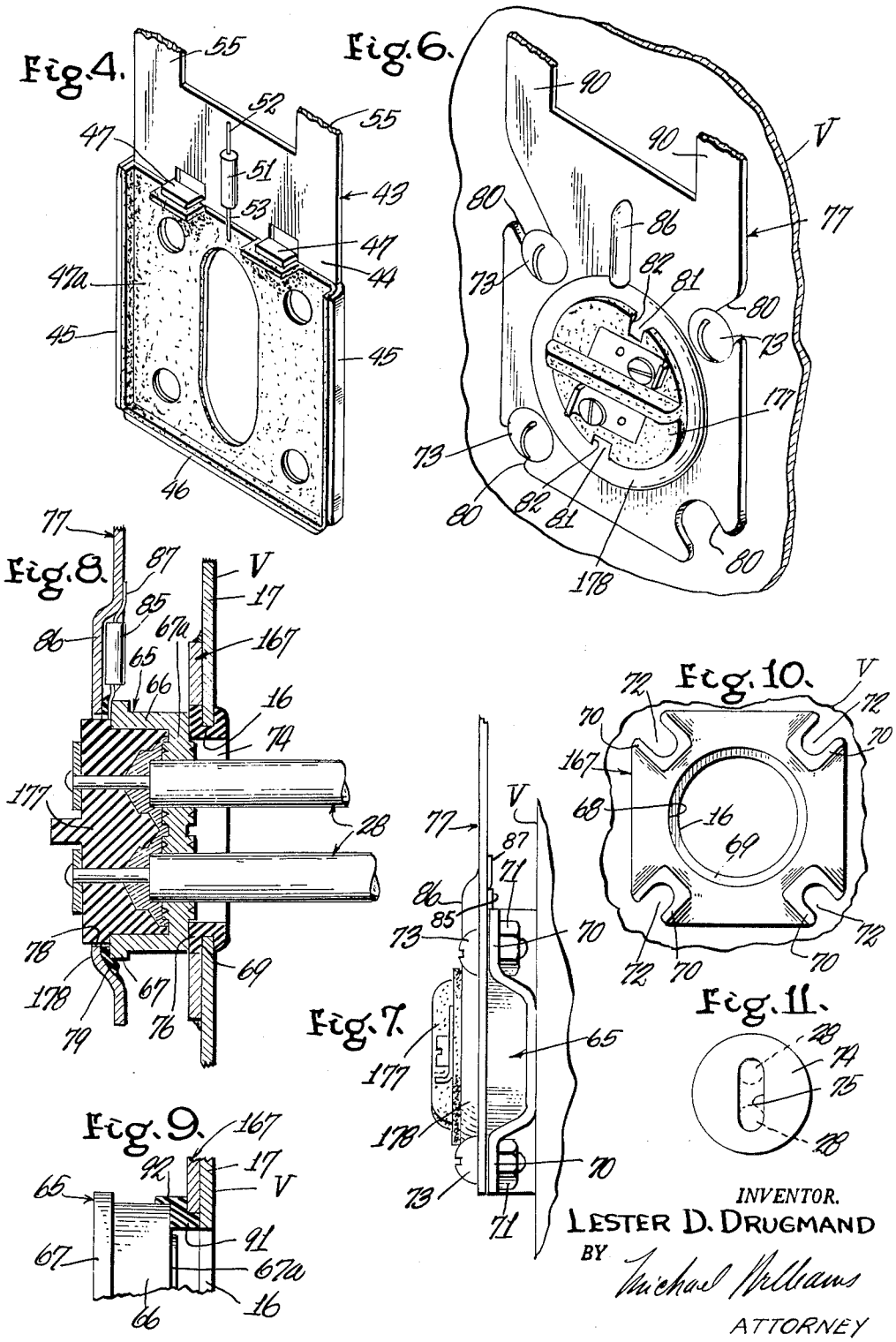

My invention relates to electric heaters, more particularly to electric immersion heaters for heating substance within a vessel, and the principal object of my invention is to provide new and improved heaters of this character.

In the drawings accompanying this specification and forming a part of this application, there are shown, for purpose of illustration, several embodiments which my invention may assume, and in these drawings:

FIGURE 1 is a perspective view of an embodiment of my invention as applied to a vessel, the latter being fragmentarily shown, FIGURE 2 is a broken side elevational view of the embodiment disclosed in FIGURE 1, FIGURE 3 is a fragmentary vertical sectional view taken through the center of the embodiment, FIGURES 4 and 5 are perspective views of parts disclosed in FIGURES 1 and 2, FIGURE 6 is a fragmentary perspective view of another embodiment of my invention, FIGURE 7 is a fragmentary side elevational view of this other embodiment, FIGURE 8 is a fragmentary vertical sectional view taken through the center of the other embodiment, FIGURE 9 is a fragmentary sectional view of a slightly different form of a part of the other embodiment, FIGURE 10 is a fragmentary plan view, drawn to a smaller scale, of a part disclosed in FIGURES 6, 7 and 8, and FIGURE 11 is a plan view of a gasket used in this other embodiment.

With reference to FIGURES 1 through 5, the embodiment therein disclosed comprises an electric heater 15 of the immersion type for heating the contents of a vessel V, which vessel may take the form of the usual hot water tank.

The vessel is formed with an opening 16 in its side wall 17, and a forged steel bushing 18 is connected to the vessel wall. The bushing 18 has a cylindrical portion 19 which is welded to the vessel wall in position surrounding the wall opening 16, and a flat square-shaped head 20 which is spaced from the exterior surface of the vessel wall.

The head 20 is formed with a circular land which is ground to form a gasket surface 21. The head is formed with openings 22 extending inwardly from its four corners for the purpose of passing and receiving the shanks of fastening bolts 23.

The immersion heater 15 comprises an electric heating element which may be of the hair-pin type as shown in FIGURE 1. The element comprises a metal sheath 24 which is customarily made of copper or copper alloy to resist corrosive action of the contents of the vessel. A coiled wire resistor 25 is disposed within the sheath and is held in central position therein by heat-conducting electric-insulating material, such as densely packed granular refractory material 26.

The heating element is customarily manufactured with the sheath initially rectilinear, and the resistor 25 and refractory material is disposed within the sheath and the latter is subjected to a side pressing or rolling action to densify the refractory material to rock-like condition. In the case of hair-pin type heater the sheath is looped centrally intermediate its ends to provide a bight 27 and a pair of legs 28—28.

Terminal pins 29 are carried by and mechanically and electrically connected to opposite ends of the resistor 25, preferably prior to disposition of the resistor within the sheath, and these terminal pins extend outwardly of respective ends of the sheath legs, as seen in FIGURE 3. Preferably, a polystyrene bushing 30 is used to close the open end of each sheath leg, with the terminal pins 29 projecting beyond the bushings.

A mounting member 31 is preferably formed of flat steel and stamped to a rectangular formation to coincide with the square shape of the head 20. The mounting member has flat, opposed sides 32, 33, and is formed during the stamping operation with four corner holes 34 and two centrally located holes 35.

A flat gasket 36, of electrical insulating material overlies the side 32 of the mounting member 31 to protect this side from corrosive action of contents of the vessel, the gasket being compressed between the side 32 and the gasket surface 21 of the bushing 18 to seal the vessel opening against leakage of fluid. The gasket is preferably of a relatively hard gasket material, such as, for example, a compressed composition of natural or synthetic rubber and asbestos.

As seen in FIGURE 3, the legs 28 of the heating element pass through the holes 35 and are considerably smaller in diameter to provide an annular space. The shanks 37 of tubular bushings are closely disposed around the legs 28 and within the holes 35 and the heads 38 of the bushings overlie the gasket 36. The bushing heads 38 are pressed against the gasket to slightly indent the latter to effect a good seal, and the heads are subjected to a staking operation to form an annular V-shaped groove 39 therein, which operation results in crowding of the bushing shanks into fluid-tight engagement with the exterior surface of the legs 28 and the interior surface of the holes 35. The bushings are preferably made of a relatively easily deformable metal, such as soft copper, and preferably tin plated.

An oblong terminal block 40 of suitable dielectric material, is held against the side 33 of the mounting member 31. The block has a pair of holes to pass the terminal pins, each hole terminating in an inwardly open recess to receive a putty-like filler 41, such as a material sold under the trademark "Silastic," which is preferably disposed over the end of each heating element leg and spread to fill the respective opening 35 and the respective inwardly opening recess in the dielectric block. Terminal strips 42—42 are supported against the outwardly directed surface of the dielectric block 40 and each is formed with a hole to pass respective terminal pins, the end of each pin being welded to the strip as shown by the headed part 42a.

A bracket 43 is provided to hold the foregoing assembly to the vessel, the bracket being formed as a suitable steel stamping. The bracket is provided with a flat portion 44, a major portion of which overlies the side 33 of the mounting member. It is to be understood that the term "bracket" is intended to cover a plate which only overlies the mounting plate and has no further edgewise extensions such as those hereinafter described.

The bracket portion 44 is provided with an opening which passes the dielectric block 40 and has four holes to pass the shanks of the fastening bolts 23. The two upright edges 45 and the bottom edge 46 of the bracket are bent to substantially right angles with respect to the flat portion 44 to proivde means for relatively locating the mounting member 31 and bracket 43. Two tabs 47 are struck from the portion 44 and bent inwardly to assist in the relative location.

A sheet of electrical insulation material 47a, such as varnished cambric, is secured in position to overlie the inner surface of the bracket portion 44 and has parts overlying the surfaces of the inturned edges 45, 46 and the inturned tabs 47, so as to completely insulate the mounting member 31 from the bracket. As seen in FIGURE 3, the edge 46 closely surrounds the adjoining edge of the mounting member to effect the relative positioning above mentioned, but the electrical insulation is interposed to electrically isolate the bracket and mounting member. The same condition holds true for the edges 45 and inturned tab 47. Thus, the bracket bounds the mounting member on all four sides with positioning means to fairly accurately align the bracket with the mounting member.

The bracket 43 has at least a portion extending laterally a substantial distance beyond an adjoining marginal edge portion of the mounting member, and this laterally extending portion is formed with a bulge to define a small well 50 to receive the body of a small radio type resistor 51 of a predetermined ohmage. One terminal 52 of the resistor is welded to the inner surface of the bracket portion and the other terminal 53 is disposed between the insulation 47a and the side 33 of the mounting member 31, thus providing a path for and regulating the amount of galvanic current flow from the vessel V to the sheath of the heating element, the circuit being established from the vessel V, through the bushing 18, the bolts 32, the bracket 43, the resistor 51, the mounting member 31 and to the metal sheath 28. The purpose of establishing a path for and regulating the amount of galvanic current is explained in U.S. Patents 2,723,340 and 2,810,815, which are assigned to the assignee of the present invention.

The foregoing construction provides a great deal of flexibility without the necessity of making and stocking a multiplicity of different immersion heaters. For example, the construction disclosed in FIGURES 1 through 5 discloses a heater which is insulated from the vessel V but which has a resistor to establish a path for and to regulate the flow of galvanic current. In some cases, where the resistor is not required, it may be removed from the bracket or it may be rendered ineffective by disposing the terminal 53 between the insulation 47a and the inner surface of the bracket portion 44, thus completely insulating the heater from the vessel. In the case where no resistor or insulation are required, these parts may be omitted or removed from the bracket 43 and the latter assembled with the mounting member 31 as before.

To insure that the mounting member 31 is insulated from the bracket 43, the four holes 34 in the mounting member are made considerably larger than the diameter of the shanks of the bolts 23 which pass therethrough, and the corresponding holes in the gasket 36 and the bracket 43 and overlying insulation sheet 47a are made to closely pass the bolt shanks. This is best shown in dotted lines in FIGURE 2.

The bracket 43 may selectively take on an additional function, namely, of holding a thermal responsive element 54 against the wall of the vessel. As shown, the flat portion 44 of the bracket has a pair of laterally extending spring fingers 55 which straddle a dielectric block 55 in which the thermostat is contained. The spring fingers 55 are spaced on opposite sides of the resistor lead 52 so as not to obscure view of this lead. A metal plate 56 underlies the dielectric block 55 and has turned-up edges 57 to position the latter. The plate is adapted to be pressed against the wall of the metallic vessel and the heat conducting portion of the thermostat is in engagement with the plate, thus conducting heat from the vessel to the thermostat. The switch points of the thermostat, as in usual manner, are electrically connected in circuit with the power supply and the terminals of the heating element to control operation of the latter in accordance with the temperature of the vessel contents.

Opposite side turned-up edges (only the right hand edge being shown in the drawing) have lower portion 60 which are spaced a greater distance from the side of the dielectric block and are formed with V-shaped recesses 60a entering from the free margin of the edges, as best seen in FIGURES 1 and 2. Each of the spring fingers 55 has a downwardly turned portion terminating in a V-shaped finger 61, the fingers fitting within respective V-shaped recesses 60a to hold the thermal responsive element in position.

To remove the thermal responsive element 54 from the position shown in FIGURES 1 and 2, it is merely necessary to pull up on the element, the spring fingers being flexed out of the V-shaped recesses by cam action therebetween. To assemble a thermal responsive elment 54 with the heater construction, it is only necessary to slide such element along the vessel wall and downwardly between the two spring fingers 61. The cam action between the fingers and the margins above the V-shaped recesses will cause the fingers to spring outwardly and thereafter seat in the V-shaped recesses.

The embodiment of the invention shown in FIGURES 6 through 11 of the drawings provides the same advantages as provided in the construction hereinbefore described but the construction is slightly different to accommodate a round mounting member.

Referring particularly to FIGURE 8, the mounting member 65 is cup-shapd and formed with a cylindrical side wall 66, the marginal edge at the opening into the member being formed with a radially outwardly extending flange 67. The bottom wall 67a of the mounting member is formed with a pair of openings to closely pass respective legs 28, 28 of the heating element, the openings being margined by tubular bosses extending from opposite sides of the bottom wall 67a, the bosses have staking indentations to crowd the bottom wall firmly against the heating element legs in fluid-tight relation. The mounting member may be made of a suitable metal, and brass is presently preferred since it resists corrosion and is readily flowable to provide for the staking operation.

The vessel connecting member 167 in this embodiment is preferably formed as a steel stamping and is generally square in plan as seen in FIGURE 10. The central openings 68 in the member 167 is larger than the opening 16 in the vessel V to form an annular gasket surface 69 therebetween. At its corners, the member 167 is formed with pockets 70 which are formed by outwardly bulging the corner portions and the pockets are adapted to closely receive respective securing nuts 71. Each pocket is slotted, as at 72, to receive the shank of a securing screw 73. The member 167 is welded in position on the vessel V.

A gasket 74 is carried by the vessel wall at the opening 16, the gasket being circular in plan view as seen in FIGURE 11, and of a U-shaped cross-section as seen in FIGURE 8. The gasket is preferably formed of a suitable rubber, such as neoprene, and is sprung into position surrounding the edges of the vessel wall at the opening 16, and protects these edges and the adjoining surface against corrosive attack from the vessel contents. The gasket has an elongated opening 75 to closely pass the legs 28—28 of the heating element, the legs being shown in dotted lines in FIGURE 11. An annular portion 76 of the gasket overlies the gasket surface 69 and is compressed between this surface and the outer surface of the bottom wall 67a of the mounting member 65 to seal the vessel opening 16.

A bracket 77 is provided for holding the mounting member 65 in desired position, this bracket having a central circular opening 78 for passing the dielectric terminal block 177 which in this case is circular but otherwise corresponds to the terminal block 40. Adjoining the opening 78, the bracket is formed with a circular outward bulge 178 to circumscribe the flange 67 of the connecting member and thus relatively position the latter and the bracket. As before, a sheet of insulation 79 is interposed between the bracket and mounting member to electrically isolate the two.

As seen in FIGURE 6, the bracket has four slots 80 which align with the slots 72 of the connecting member 167. The screw 73, with nuts 71 loosely attached, may be moved edgewise into the aligned slots 72–80, and the screws threaded down by means of a screw driver to firmly press the bracket 77 and insulation 79 against the flange 67 of the mounting member 65, and to press the latter member against the gasket 74.

The bracket 77 has a pair of diametrically opposed tabs 81 extending inwardly of the opening 78, the tabs fitting within slots 82 in the dielectric block 177. Since the block is firmly held in the well of the cup-shaped mounting member 65, the tabs 81 and slots 82 will insure that the heater is always positioned within the vessel with the heating element legs 28—28 in vertical alignment, rather than horizontal alignment, since the legs in vertical alignment resist vibration forces better.

A resistor 85 is disposed within a bulge 86 in the bracket 77, as before, and has one terminal 87 welded to the bracket and the other terminal disposed between the flange 67 and the insulation 79 to provide a path for and to regulate flow of galvanic current from the vessel V to the sheath of the heating element. The bracket 77 may have spring fingers 90—90 extending therefrom to support a thermal responsive element as before.

The gasket 91 shown in FIGURE 9 is similar to gasket 74 but the U-shaped section is omitted and a circular portion 92 is added to closely encircle the cylindrical 66 wall of the mounting member 65.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:
1. An electric immersion heater connected to and for heating substance within a metallic vessel, said heater comprising an electric heating element of the metal sheathed type having its active heating portion extending through an opening in the wall of said vessel and into the latter and having its terminal portion disposed exteriorly of said vessel, a metallic mounting member extending transversely of and mechanically and electrically connected to the metallic sheath of the terminal portion of said heating element, said mounting member supporting said heating element and having one side directed toward the vessel wall, gasket means interposed between said one side and the vessel wall around the opening in the latter to seal said opening and to electrically insulate said mounting member from said vessel, a dielectric terminal block secured to said mounting member and extending from the opposite side thereof, said block being of less transverse size than said mounting member to leave marginal portions of said opposite side exposed, a metallic bracket having an opening to pass said terminal block and overlying substantially the entire exposed marginal portions of said opposite side and having at least a portion extending laterally a substantial distance beyond an adjoining marginal edge portion of said mounting member, electrical insulation interposed between said mounting member and said bracket to electrically insulate the same, said bracket being mechanically and electrically connected to said vessel to press, through said electrical insulation, against said mounting member to urge the latter in a direction toward said wall and against said gasket, and current resistor means carried by said bracket and movable therewith, having one lead electrically and mechanically connected to said laterally extending portion of said bracket outwardly of said marginal edge portion of said mounting member, the other lead extending inwardly of said marginal edge portion of said mounting member to overlie and directly contact the exposed marginal portion of said mounting member so that it is in position to be pressed against and thereby electrically connected to said mounting member edge portion by said insulation and said bracket member.

2. The construction according to claim 1 wherein said resistor means is of the radio type and said mechanical connection holds said resistor means with its longitudinal axis parallel to said bracket, and wherein said laterally extending portion of said bracket has a localized bulge to define a well for receiving said resistor.

3. The construction of claim 1 wherein said bracket has a pair of spring arms extending from its said laterally extending portion for pressing a thermal control element against said vessel wall, the spring arms being spaced on opposite sides of the connection of said one resistor lead to said bracket so as not to obscure view of said lead.

References Cited by the Examiner

UNITED STATES PATENTS

| | | | |
|---|---|---|---|
| 2,561,474 | 7/51 | Ingels | 219—336 |
| 2,575,150 | 11/51 | Wellman | 219—328 |
| 2,594,255 | 4/52 | Charbonneau | 219—318 X |
| 2,613,312 | 10/52 | Thurston | 219—318 |
| 2,686,031 | 8/54 | Bolesky. | |
| 2,810,815 | 10/57 | Dicome | 219—336 |
| 2,947,846 | 8/60 | Fox | 219—536 |
| 3,056,879 | 10/62 | Fischer | 219—318 |

RICHARD M. WOOD, *Primary Examiner.*
ANTHONY BARTIS, *Examiner.*